United States Patent
Yang et al.

(10) Patent No.: US 11,821,571 B2
(45) Date of Patent: Nov. 21, 2023

(54) PLAYBACK CONTROL METHOD, APPARATUS SYSTEM, ELECTRONIC DEVICE AND STORAGE MEDIUM

(71) Applicants: BOE Intelligent IoT Technology Co., LTD., Beijing (CN); BOE Technology Group Co., Ltd., Beijing (CN)

(72) Inventors: Jinghua Yang, Beijing (CN); Kaiyuan Zhou, Beijing (CN); Haiyan Wan, Beijing (CN); Zhensheng Bi, Beijing (CN)

(73) Assignees: BOE Intelligent IoT Technology Co., LTD., Beijing (CN); BOE Technology Group Co., Ltd., Beijing (CN)

( * ) Notice: Subject to any disclaimer, the term of this patent is extended or adjusted under 35 U.S.C. 154(b) by 5 days.

(21) Appl. No.: 17/585,050

(22) Filed: Jan. 26, 2022

(65) Prior Publication Data
US 2022/0243866 A1 Aug. 4, 2022

(30) Foreign Application Priority Data
Jan. 29, 2021 (CN) .......................... 202110133171.1

(51) Int. Cl.
*G09G 5/00* (2006.01)
*F16M 11/08* (2006.01)
*F16M 13/02* (2006.01)

(52) U.S. Cl.
CPC .......... *F16M 11/08* (2013.01); *F16M 13/022* (2013.01); *G09G 5/006* (2013.01); *G09G 2356/00* (2013.01); *G09G 2360/04* (2013.01); *G09G 2370/08* (2013.01)

(58) Field of Classification Search
CPC ..... G09G 5/00; G09G 2356/00; F16M 13/022
USPC ....................................................... 248/186.1
See application file for complete search history.

(56) References Cited

U.S. PATENT DOCUMENTS

2016/0142747 A1* 5/2016 He ........................ H04N 5/2723
 725/32
2017/0092321 A1* 3/2017 Anderson ............ G11B 27/022

FOREIGN PATENT DOCUMENTS

| CN | 103458286 A | 12/2013 |
|---|---|---|
| CN | 103905886 A | 7/2014 |
| CN | 105472434 A | 4/2016 |
| CN | 107547930 A | 1/2018 |
| CN | 110719522 A | 1/2020 |
| CN | 112235620 A | 1/2021 |

OTHER PUBLICATIONS

CN202110133171.1 first office action.

* cited by examiner

*Primary Examiner* — Todd M Epps
(74) *Attorney, Agent, or Firm* — IPro, PLLC

(57) ABSTRACT

A method of playback control is provided. The method is performed by a driving controller, and the method includes: sending, by the driving controller, a pose adjustment instruction to a pose adjustment mechanism, wherein the pose adjustment instruction is used to instruct to adjust a pose of a media player, and the pose adjustment mechanism is configured to adjust the pose of the media player; and sending, by the driving controller, a media control instruction to the media player, wherein the media control instruction is used to instruct to control playback of media data.

16 Claims, 6 Drawing Sheets

PLAYBACK CONTROL METHOD, APPARATUS SYSTEM, ELECTRONIC DEVICE AND STORAGE MEDIUM

CROSS-REFERENCE TO RELATED APPLICATION

The present disclosure claims priority to Chinese Patent Application No. 202110133171.1, filed on Jan. 29, 2021, and entitled "CONTROL METHOD AND APPARATUS FOR DISPLAY SYSTEM, AND DISPLAY SYSTEM", the contents of which are incorporated herein by reference in its entirety.

TECHNICAL FIELD

The present disclosure relates to the technical field of display, and in particular, relates to a method of playback control, a playback control apparatus, a playback control system, an electronic device and a non-transitory computer-readable storage medium.

BACKGROUND

Digital signage is a multimedia audio-video system that distributes information through a display module (a media player) in public places. The public places are, for example, malls, supermarkets, hotel lobbies, restaurants, cinemas and other places where people gather, and the information distributed by the display module is, for example, business information, financial information and entertainment information. The current digital signage products tend to be diversified, ultra-thin and lightweight.

SUMMARY

The present disclosure provides a method of playback control, a playback control apparatus, a playback control system, an electronic device and a non-transitory computer-readable storage medium.

According to a first aspect, a method of playback control is provided. The method is performed by a driving controller in a media playback system, the media playback system further includes a pose adjustment mechanism and a media player, the pose adjustment mechanism is configured to adjust a pose of the media player, and the method includes:
  sending a pose adjustment instruction to the pose adjustment mechanism, wherein the pose adjustment instruction is used to instruct to adjust the pose of the media player; and
  sending a media control instruction to the media player, wherein the media control instruction is used to instruct to control playback of media data.

Optionally, the media player includes a display module, and the media data includes an image.

Optionally, sending the media control instruction to the media player includes one of:
  sending the media control instruction to the media player while sending the pose adjustment instruction to the pose adjustment mechanism; and
  sending the media control instruction to the media player based on a current pose of the media player after sending the pose adjustment instruction to the pose adjustment mechanism.

Optionally, the media playback system further includes a pose sensor, and sending the media control instruction to the media player based on the current pose of the media player includes:
  receiving pose feedback information sent by the pose sensor, wherein the pose feedback information is used to indicate the current pose of the media player; and
  sending the media control instruction to the media player based on the current pose of the media player indicated by the pose feedback information.

Optionally, sending the media control instruction to the media player based on the current pose of the media player includes:
  sending the media control instruction to the media player based on the current pose of the media player when the current pose of the media player belongs to a pose set.

Optionally, the media control instruction is used to instruct to control playback of the media data according to a target playback mode; and
  the target playback mode is one of playback modes corresponding to poses in the pose set, and the target playback mode corresponds to the current pose.

Optionally, the method satisfies at least one of the following conditions:
  the media control instruction includes either of the following information: information about the target playback mode and information about the current pose; and
  the media player includes a display module and the media data includes a video; and the target playback mode includes a mode of playing the media data starting at a target video frame, wherein the target video frame belongs to a currently playing video of the media player, or the target video frame belongs to a video other than the currently playing video.

Optionally, the method further includes: receiving a trigger instruction;
  sending the pose adjustment instruction to the pose adjustment mechanism includes: sending the pose adjustment instruction to the pose adjustment mechanism in response to the trigger instruction; and
  sending the media control instruction to the media player includes: sending the media control instruction to the media player in response to the trigger instruction.

Optionally, the trigger instruction is used to indicate a target pose, and sending the pose adjustment instruction to the pose adjustment mechanism in response to the trigger instruction includes:
  determining the target pose indicated by the trigger instruction; and
  sending the pose adjustment instruction to the pose adjustment mechanism, wherein the pose adjustment instruction is used to instruct to adjust the pose of the media player to the target pose.

Optionally, the method satisfies any of the following conditions:
  the trigger instruction includes information about the target pose, and determining the target pose indicated by the trigger instruction includes: determining the target pose based on the information about the target pose; and
  determining the target pose indicated by the trigger instruction includes: determining at least one pose in a pose list after the current pose of the media player as the target pose; and
  sending the pose adjustment instruction to the pose adjustment mechanism includes: sending at least one pose adjustment instruction in a one-to-one correspondence with the at least one pose to the pose adjustment mechanism in a sequence of the at least one pose in the pose list, wherein the pose adjustment instruction is used to instruct to adjust the pose of the media player to a corresponding pose.

Optionally, the trigger instruction includes target operation information for instructing an operation on the pose of the media player, and sending the media control instruction to the media player in response to the trigger instruction includes:

sending the media control instruction corresponding to the target operation information to the media player based on a correspondence between operation information and control instructions.

Optionally, the media playback system includes a plurality of pose adjustment mechanisms and a plurality of media players which are in a one-to-one correspondence, and each of the pose adjustment mechanisms is configured to adjust a pose of a corresponding media player;

Optionally, the method satisfies at least one of the following conditions sending the pose adjustment instruction to the pose adjustment mechanism includes: sending pose adjustment instructions to the plurality of pose adjustment mechanisms simultaneously; and sending the media control instruction to the media player includes: sending media control instructions to the plurality of media players simultaneously;

the media control instruction is used to instruct to play the media data, and the plurality of media control instructions sent by the driving controller to the plurality of media players satisfy either of the following conditions: the plurality of media control instructions indicate the same media data; and, the plurality of media control instructions indicate different pieces of media data, wherein each piece of the media data is a video, and video frames with the same serial number in pieces of the media data indicated by the plurality of media control instructions are obtained by segmenting the same image; and the method further includes: sending a playback progress adjustment instruction to at least one media player when playback progresses of the plurality of media players are unsynchronized, to synchronize the playback progresses of the plurality of media players.

Optionally, the media player includes a display module, the media data includes an image, the media playback system further includes a pose sensor, and sending the media control instruction to the media player includes:

receiving, after sending the pose adjustment instruction to the pose adjustment mechanism, pose feedback information sent by the pose sensor, wherein the pose feedback information is used to indicate a current pose of the media player; and sending the media control instruction to the media player based on the current pose of the media player when the current pose of the media player indicated by the pose feedback information belongs to a pose set, wherein the media control instruction is used to instruct to control playback of the media data according to a target playback mode, the target playback mode is one of playback modes corresponding to poses in the pose set, and the target playback mode corresponds to the current pose;

the media player includes a display module and the media data includes a video; and the target playback mode includes a mode of playing the media data starting at a target video frame, wherein the target video frame belongs to a currently playing video of the media player, or the target video frame belongs to a video other than the currently playing video;

the media control instruction includes either of the following information: information about the target playback mode and information about the current pose;

the trigger instruction includes target operation information for instructing an operation on the pose of the media player, and sending the media control instruction to the media player in response to the trigger instruction includes: sending the media control instruction corresponding to the target operation information to the media player based on a correspondence between operation information and control instructions;

the media playback system includes a plurality of pose adjustment mechanisms and a plurality of media players which are in a one-to-one correspondence, and each of the pose adjustment mechanisms is configured to adjust a pose of a corresponding media player;

sending the pose adjustment instruction to the pose adjustment mechanism includes: sending pose adjustment instructions to the plurality of pose adjustment mechanisms simultaneously; and sending the media control instruction to the media player includes: sending media control instructions to the plurality of media players simultaneously;

the media control instruction is used to instruct to play the media data, and the plurality of media control instructions sent by the driving controller to the plurality of media players satisfy either of the following conditions: the plurality of media control instructions indicate the same media data, and the plurality of media control instructions indicate different pieces of media data; and the method further includes: sending a playback progress adjustment instruction to at least one media player when playback progresses of the plurality of media players are unsynchronized, to synchronize the playback progresses of the plurality of media players.

According to a second aspect, a method of playback control is provided. The method is performed by a media player in a media playback system, the media playback system further includes a pose adjustment mechanism and a driving controller, the pose adjustment mechanism is configured to adjust a pose of the media player, and the method includes:

receiving a media control instruction sent by the driving controller, wherein the media control instruction includes information about a current pose of the media player;

determining, based on the information about the current pose in the media control instruction, a target playback mode corresponding to the current pose from playback modes corresponding to poses in a pose set, wherein the current pose is one of the poses in the pose set; and controlling playback of media data according to the target playback mode.

According to a third aspect, a media playback system is provided, includes: a driving controller, a pose adjustment mechanism and a media player, wherein the driving controller is configured to send a pose adjustment instruction to the pose adjustment mechanism, wherein the pose adjustment instruction is used to instruct to adjust a pose of the media player;

the driving controller is further configured to send a media control instruction to the media player, wherein the media control instruction is used to instruct to control playback of media data;

the pose adjustment mechanism is configured to adjust the pose of the media player according to the pose adjustment instruction; and the media player is configured to control playback of the media data according to the media control instruction.

According to a fourth aspect, an electronic device is provided, including a processor, a communication interface, a memory, and a communication bus. Any two of the processor, the communication interface, and the memory communicate with each other through the communication bus;

the memory is configured to store a computer program; and the processor is configured to implement any method described in the first aspect when executing the computer program stored in the memory.

According to a fifth aspect, an electronic device is provided, including a processor, a communication interface, a memory, and a communication bus. Any two of the processor, the communication interface, and the memory communicate with each other through the communication bus;

the memory is configured to store a computer program; and the processor is configured to implement any method described in the second aspect when executing the computer program stored in the memory.

According to a sixth aspect, a non-transitory computer-readable storage medium is provided. Instructions are stored on the non-transitory computer-readable storage medium, and when the instructions are run on a computer, the computer executes any method described in the first aspect.

According to a seventh aspect, a non-transitory computer-readable storage medium is provided. Instructions are stored on the non-transitory computer-readable storage medium, and when the instructions are run on a computer, the computer executes any method described in the second aspect.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by those of ordinary skill in the art based on the embodiments of the present disclosure without creative efforts should fall within the protection scope of the present disclosure.

Digital signage is a media player, and the current digital signage is capable of playing media data (for example, a video), but a media playback system has a relatively limited function. The embodiments of the present disclosure provide a media playback system. In the media playback system, a driving controller can send a pose adjustment instruction to a pose adjustment mechanism and send a media control instruction to a media player, to control the pose adjustment mechanism to adjust a pose of the media player and control the media player to play media data, thereby enriching functions of the media playback system.

To facilitate understanding of the present disclosure, the media playback system provided in the embodiments of the present disclosure is first described with examples.

Figure 1:
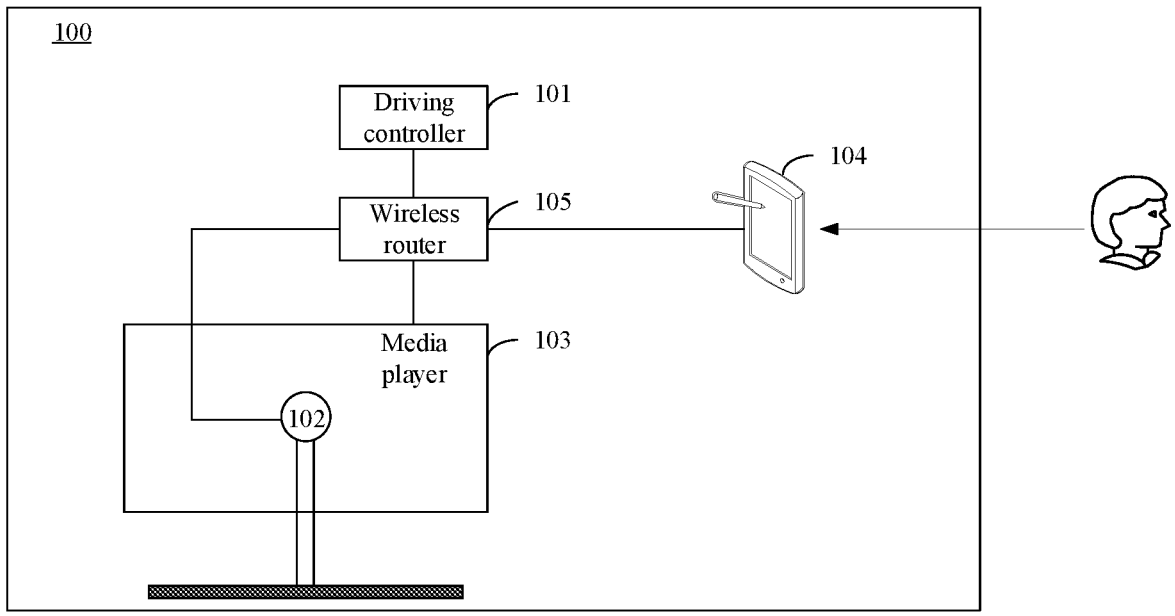
FIG. 1 is a schematic architecture diagram of a media playback system according to an embodiment of the present disclosure.

FIG. 1 is a schematic architecture diagram of a media playback system according to an embodiment of the present disclosure. As shown in FIG. 1, the media playback system 100 includes: a driving controller 101, a pose adjustment mechanism 102, and a media player (for example, a media player 103 in FIG. 1).

The driving controller 101 may be a programmable logic controller (PLC), the driving controller 101 and the pose adjustment mechanism 102 form a complete module, and the driving controller 101 may be configured to control the pose adjustment mechanism 102.

The pose adjustment mechanism 102 is configured to adjust a pose of the media player 103. The pose adjustment mechanism 102 may include: a driving mechanism (a stepper motor for example), a base, a support rod, a gear, an adjustment rod and other components. The structure of the pose adjustment mechanism 102 is not limited in this embodiment of the present disclosure. The pose of the media player refers to: a position and a posture of the media player in a specified coordinate system. Optionally, the origin of the specified coordinate system is a connection point between the media player and the pose adjustment mechanism 102. In this embodiment of the present disclosure, it is assumed that the media player 103 is fixed to the support rod. The pose adjustment mechanism 102 can control the media player 103 to rotate around the support rod in a range of 360°, and/or the pose adjustment mechanism 102 can control the media player 103 to rotate in a plane parallel to the support rod in a range of 360°. For example, the pose adjustment mechanism 102 includes two motors, one motor is configured to control the media player 103 to rotate around the support rod in a range of 360°, and the other motor is configured to control the media player 103 to rotate in the plane parallel to the support rod in a range of 360°.

The media player 103 may be a display module, an audio player, or other devices capable of playing media data. The display module may include: a display panel (flat or curved), a power supply, a timing controller board (also referred to as a TCON board, a logic board or a control board), a board (for example, an RK3399 board), and the like. The power supply is connected to the display panel, the TCON board and the board to supply power to the display panel, the TCON board and the board. The TCON board is connected to the display panel and is configured to control the display panel to display images. If the media player is a display module, the media data played by the media player may include images. For example, each piece of the media data is a video.

It should be noted that the media playback system 100 may include at least one (one or more) media player 103. Correspondingly, the media playback system 100 may include at least one (one or more) pose adjustment mechanism 102. One media player 103 and one pose adjustment mechanism 102 are shown only as an example in FIG. 1. Optionally, when the media playback system 100 includes a plurality of media players 103, the media playback system 100 further includes a plurality of pose adjustment mechanisms 102 in a one-to-one correspondence with the plurality of media players 103, and each pose adjustment mechanism 102 is configured to adjust a pose of a corresponding media player 103.

In an embodiment, the driving controller 101 is further communicatively connected to the pose adjustment mechanism 102 and the media player 103, to control the pose adjustment mechanism 102 to adjust the pose of the media player 103 and control the media player 103 to play the media data. In an optional implementation, as shown in FIG. 1, the driving controller 101, the pose adjustment mechanism 102 and the media player 103 are separately connected to a wireless router 105 through a network port, such that the driving controller 101, the pose adjustment mechanism 102 and the media player 103 can be in the same local area network. In this way, the driving controller 101 is communicatively connected to the pose adjustment mechanism 102 and the media player 103.

It should be noted that the driving controller 101 communicatively connected to the pose adjustment mechanism 102 and the media player 103 through WLAN communication is only an implementation. In practice, the driving controller 101, the pose adjustment mechanism 102 and the media player 103 may alternatively be connected through a wired cable, Bluetooth or other communication. This is not limited in the present disclosure.

In an embodiment, the media playback system 100 further includes a control device 104, which is communicatively connected to the driving controller 101 to control the driving controller 101. In an optional implementation, the control device 104 may be connected to the wireless router 105 through Wi-Fi, such that the control device 104 and the driving controller 101 can be in the same local area network. In this way, the control device 104 is communicatively connected to the driving controller 101. Optionally, the control device 104 may be various electronic devices with an electronic display, including but not limited to: a smartphone, a tablet computer, a laptop computer, a desktop computer, a server, or the like. A tablet computer is used only as an example in FIG. 1. It should be noted that the driving controller 101 communicatively connected to the control device 104 through WLAN communication is only an implementation. In practice, the driving controller 101 and the control device 104 may alternatively be connected through a wired cable, Bluetooth or other communication. This is not limited in the present disclosure.

In an embodiment, the media playback system 100 further includes a pose sensor (not shown in the figure), configured to detect the pose of the media player 103, and send pose feedback information to the driving controller 101 based on the detected pose. The meaning of the pose feedback information and an operation implemented by the driving controller 101 in response to the pose feedback information are not described in detail herein and will be described in the method procedure shown in FIG. 3 below.

The media playback system 100 may include one or more pose sensors. When the media playback system 100 includes one pose sensor, the pose sensor is configured to detect a pose of each media player 103. When the media playback system 100 includes a plurality of pose sensors, the plurality of pose sensors may be in a one-to-one correspondence with the plurality of media players 103, and each pose sensor is configured to detect a pose of a corresponding media player 103; or when the media playback system 100 includes a plurality of pose sensors, the plurality of pose sensors may be in a one-to-one correspondence with a plurality of groups of media players 103, and each pose sensor is configured to detect a pose of a corresponding group of media players 103.

Figure 2:
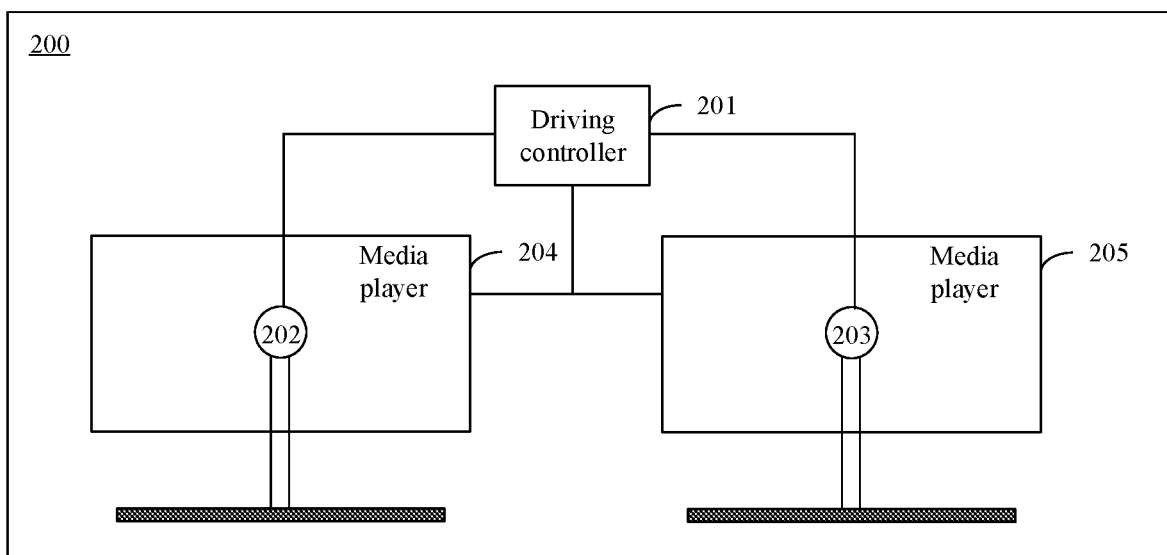
FIG. 2 is a schematic architecture diagram of another media playback system according to an embodiment of the present disclosure.

FIG. 2 is a schematic architecture diagram of another media playback system according to an embodiment of the present disclosure. As shown in FIG. 2, the media playback system 200 includes a driving controller 201, a pose adjustment mechanism 202, a pose adjustment mechanism 203, a media player 204 and a media player 205.

Compared with the media playback system 100 shown in FIG. 1, in the media playback system 200 shown in FIG. 2, each media player may correspond to one pose adjustment mechanism. For example, as shown in FIG. 2, the media player 204 corresponds to the pose adjustment mechanism 202 and the media player 205 corresponds to the pose adjustment mechanism 203.

The driving controller 201 is communicatively connected to the pose adjustment mechanism 202 and the pose adjustment mechanism 203 separately, to control the pose adjustment mechanism 202 and the pose adjustment mechanism 203. It can be learned that in the media playback system 200 shown in FIG. 2, the driving controller 201 can control each pose adjustment mechanism, to adjust poses of different media players separately.

The method of playback control provided in the present disclosure is further explained and described below with the accompanying drawings. The embodiments do not constitute a limitation to the embodiments of the present disclosure.

Figure 3:
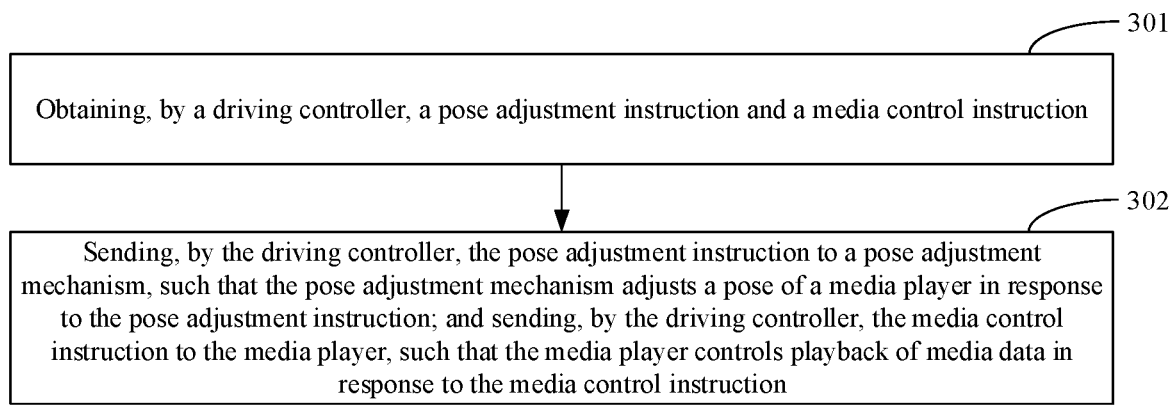
FIG. 3 is a flowchart of a method of playback control according to an embodiment of the present disclosure.

FIG. 3 is a flowchart of a method of playback control according to an embodiment of the present disclosure. In an embodiment, the method may be applied to the driving controller in FIG. 1 or FIG. 2 and includes the following steps:

In step 301, the driving controller obtains a pose adjustment instruction and a media control instruction.

The pose adjustment instruction is used to instruct to adjust a pose of a media player, and the media control instruction is used to instruct to control playback of media data.

Optionally, the pose adjustment instruction and the media control instruction may be implemented based on the Transmission Control Protocol (TCP) protocol or the Modbus protocol (a serial communication protocol). This is not limited in the present disclosure.

In an embodiment, the driving controller obtains the pose adjustment instruction and the media control instruction in response to a received trigger instruction. Certainly, the driving controller may alternatively obtain the pose adjustment instruction and the media control instruction without the trigger instruction. For example, the driving controller may obtain the pose adjustment instruction and the media control instruction periodically.

Figure 4:
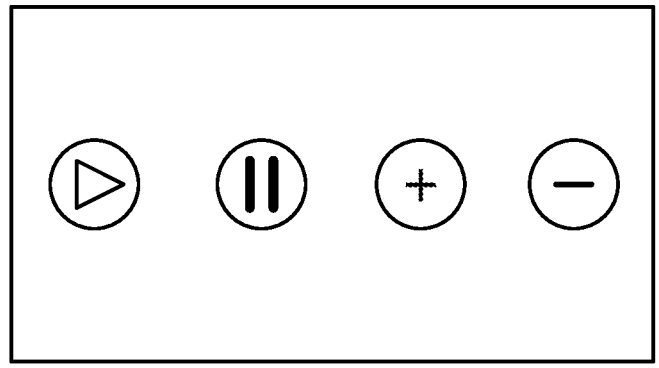
FIG. 4 is a schematic diagram of a control interface.

In an optional implementation, a control interface of the driving controller 101 may be output (for example, displayed) by a control device. As shown in FIG. 4, the control interface may include a plurality of function buttons (for example, function buttons that can be pressed, function buttons that can be touched, or function buttons that can be manipulated via a mouse), and each function button corresponds to one control operation. The function buttons include, but are not limited to, a function button for instructing a control operation of starting adjusting the pose of the media player (the first function button from left to right in FIG. 4), a function button for instructing a control operation of stopping adjusting the pose of the media player (the second function button from left to right in FIG. 4), a function button for instructing a control operation of increasing the playback volume of the media player (the third function button from left to right in FIG. 4), and a function button for instructing a control operation of decreasing the playback volume of the media player (the fourth function button from left to right in FIG. 4), and the like. On this basis, during application, a user may trigger a corresponding function button according to the actual need. When detecting that the function button is triggered, the control device may send a trigger instruction corresponding to the triggered function button to the driving controller, such that the driving controller can receive the trigger instruction sent by the control device, and then obtain the pose adjustment instruction and the media control instruction in response to the received trigger instruction. Thus, in the media playback system provided in the present disclosure, the user can remotely control the driving controller through the control device, to realize remote control of the pose of the media player and playback of the media data.

In another optional implementation, the driving controller may output the control interface locally, or the driving controller has an operation panel. When the driving controller has an operation panel, the operation panel may be similar to the control interface described above, and include a plurality of function buttons. On this basis, during application, when the driving controller detects that the user triggers any function button, it means that the driving controller receives a corresponding trigger instruction, and then the driving controller generates the pose adjustment instruction and the media control instruction in response to the received trigger instruction. Thus, in the media playback system provided in the present disclosure, the user can control the driving controller locally, to realize local control of the pose of the media player and playback of the media data.

Figure 5:
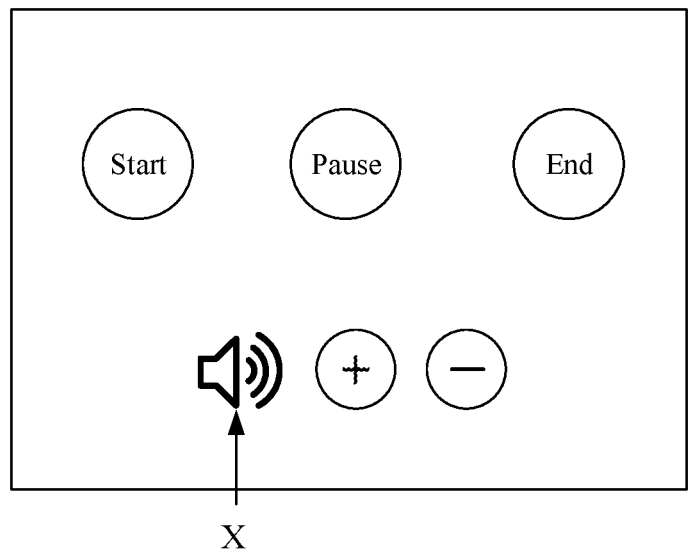
FIG. 5 is another schematic diagram of a control interface.

The control interface of the driving controller 101 may alternatively be the interface shown in FIG. 5. The start button in FIG. 5 has the same function as the first button in FIG. 4, the end button in FIG. 5 has the same function as the second button in FIG. 4, and the pause button in FIG. 5 is used for instructing a control operation of pausing pose adjustment of the media player. FIG. 5 further includes a function button for instructing a control operation of increasing the playback volume of the media player, a function button for instructing a control operation of decreasing the playback volume of the media player, or the like. In addition, FIG. 5 further includes an icon X for adjusting the playback volume.

In addition, in this embodiment, the control interface in FIG. 4 is used as an example, and the control interface may be set as follows during application to avoid user maloperation.

1. If the function button for instructing a control operation of starting adjusting the pose of the media player (the first function button from left to right in FIG. 4) is triggered, the first function button is deactivated to prevent the user from triggering it by mistake.

2. If the function button used for instructing a control operation of stopping adjusting the pose of the media player (the second function button from left to right in FIG. 4) is triggered, the second function button is deactivated to prevent the user from triggering it by mistake. In this case, the first function button from left to right in FIG. 4 may be active, such that the user can trigger the first function button.

After the media player completes playing the media data, the function buttons on the control interface are all active.

During application, an appearance color of the function button may be set to gray to indicate that the function button is inactive, and an appearance color of the function button may be set to red to indicate that the function button is active.

To avoid user disoperation, the control interface shown in FIG. 5 may also be set as above. On this basis, if the pause button in FIG. 5 is triggered, the pause button is deactivated to prevent the user from triggering it by mistake. In this case, both the start button and the end button in FIG. 5 may be active, such that the user can trigger the two function buttons.

In this embodiment, how the driving controller generates the pose adjustment instruction in response to the received trigger instruction is not described in detail herein and will be explained below through the procedure shown in FIG. 6. Similarly, how the driving controller generates the media control instruction in response to the received trigger instruction is not described in detail herein and will be explained below through the procedure shown in FIG. 9.

In another embodiment, based on the above embodiment, the driving controller may further obtain and send a media control instruction to the media player after sending the pose adjustment instruction to the pose adjustment mechanism (when the pose adjustment mechanism adjusts the pose of the media player according to the pose adjustment instruction). The media control instruction obtained by the driving controller is a synchronization signal for instructing the media player to synchronize playback of the media data with the pose of the media player.

For example, a media player in the media playback system is used as an example. After the driving controller sends the pose adjustment instruction to the pose adjustment mechanism, the pose adjustment mechanism adjusts the pose of the media player according to the pose adjustment instruction. In this process, a pose sensor may detect pose information of the media player in real time and send pose feedback information to the driving controller based on the detected pose information. The pose feedback information includes at least information about a current pose of the media player (the pose feedback information is used to indicate the current pose of the media player). After receiving the pose feedback information, the driving controller extracts the information about the current pose of the media player from the pose feedback information and determines the current pose of the media player.

Optionally, the driving controller may send the media control instructions to the media player based on the current pose after determining the current pose of the media player. Alternatively, the driving controller may alternatively send the above synchronization signal (the media control instruction) to the media player when the current pose of the media player belongs to a pose set. If the driving controller sends the media control instruction to the media player only when the current pose of the media player belongs to the pose set, the driving controller does not need to send the media control instruction to the media player frequently. This reduces power consumption of the driving controller.

It should be noted that in this embodiment, the pose set may include one or more poses (preset poses). In this way, in the process of adjusting the pose, each time the media player achieves a pose in the pose set, the driving controller sends a media control instruction to the media player.

In an optional implementation, the driving controller locally stores a synchronization information table, which includes a correspondence between poses in the pose set and playback modes. On this basis, when the driving controller determines that the current pose of the media player belongs to the pose set, the driving controller can search the synchronization information table for the target playback mode corresponding to the current pose and generate the media control instruction (for instructing to control playback of the media data according to the target playback mode, for example, including information about the target playback mode) corresponding to the target playback mode, such that the media player plays the media data according to the target playback mode. It can be learned that the driving controller controls, based on the current pose of the media player, the media player to play the media data in an appropriate playback mode, thereby improving the playback effect of the media player.

Figure 7:
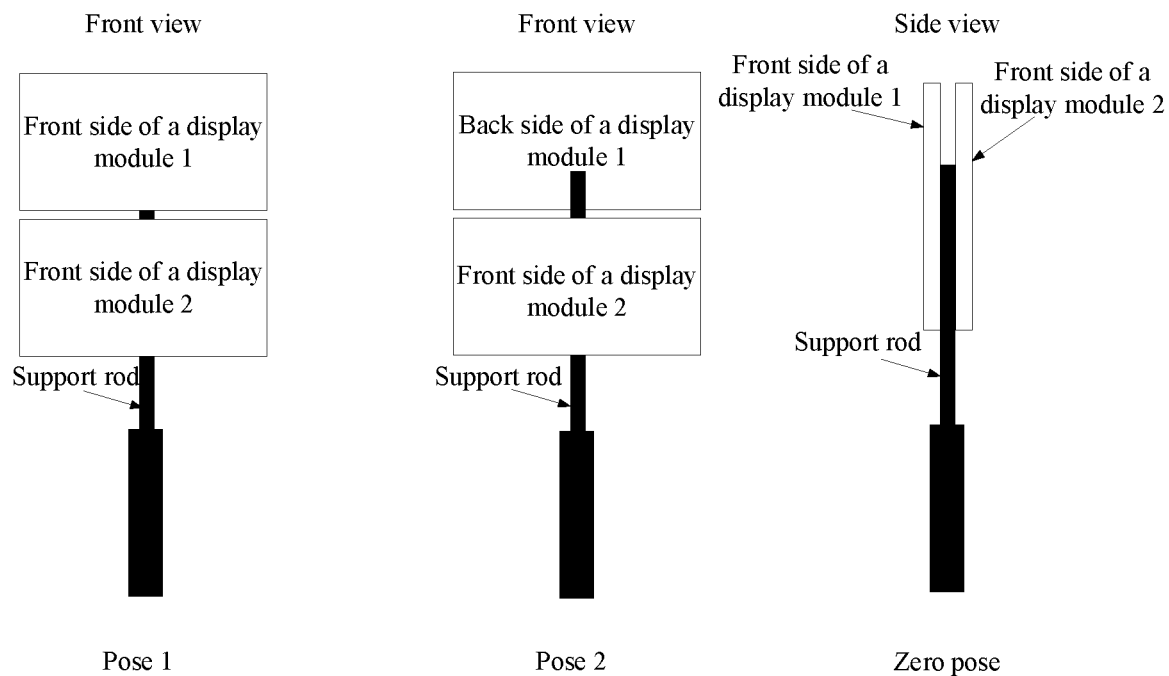
FIG. 7 is a schematic diagram of poses of display modules.

For example, it is assumed that each time the pose adjustment mechanism receives the pose adjustment instruction for instructing to start adjusting the pose of the media player, the pose of the media player is adjusted from a preset zero pose (that is, an initial pose) based on a preset pose change cycle. The pose change cycle mentioned here includes a plurality of poses in a specific sequence, for example, three poses, which are sequentially referred to as a zero pose (also referred to as a pose 0), a pose 1, and a pose 2 for the convenience of description. It is assumed that the media playback system includes media players 1 and 2, and the two media players are both display modules. The display modules are fixed on the same support rod. Three poses of each display module are shown in FIG. 7, and the poses 1 and 2 are presented in the front view and the zero pose is presented in the side view in FIG. 7. At the zero pose, the two display modules are back-to-back to realize double-side display; at the pose 1, the front sides of the two display modules are located on the same side of the support rod to realize splicing display; at the pose 3, the front sides of the two display modules are located on different sides of the support rod to realize multi-side display. During application, in each pose change cycle, the pose change process of each display module is zero pose-pose 1-pose 2-zero pose. Further, if no pose adjustment instruction for instructing to stop adjusting the pose of the display module is received, after each pose change cycle is completed, the next pose change cycle is continued until the pose adjustment instruction for instructing to stop adjusting the pose of the display module is received.

Further, it is assumed that the above synchronization information table is shown in the following Table 1.

TABLE 1

| Pose | Playback mode |
|---|---|
| Pose 1 | Frame skipping playback |
| Pose 2 | Source switching |

According to the above description, when determining that the media player is at the pose 1, the driving controller searches the synchronization information table shown in Table 1 for the target playback mode corresponding to the pose 1, which is frame skipping playback, and generates a media control instruction (synchronization signal) corresponding to the frame skipping playback, such that the media player performs frame skipping playback. For example, during frame skipping, the media player may jump to a specified video frame (target video frame) in a current playback source (currently playing video) to start playback of the media data. When determining that the media player is at the pose 2, the driving controller searches the synchronization information table shown in Table 1 for the target playback mode corresponding to the pose 2, which is source switching, and generates a media control instruction (synchronization signal) corresponding to source switching, such that the media player switches the source, that is, starts to play another specified source (another video different from the currently playing video).

It can be learned that, when the media player includes a display module, the media data includes a video, and the target playback mode includes: playing the media data from the target video frame, wherein the target video frame belongs to the currently playing video of the media player (the target playback mode is frame skipping playback), or the target video frame belongs to a video other than the currently playing video (the target playback mode is source switching). When the target playback mode is frame skipping playback, if the target video frame is not played by the media player at the current pose, the media player may play the target video frame through frame skipping playback according to the instruction of the media control instruction, to avoid playback delay caused by the slow playback speed of the media player.

It should be noted that the playback modes in Table 1 are only used for example. In actual applications, there may be other playback modes, such as multi-speed playback, slow playback, split-screen playback, and so on. This is not limited in the present disclosure.

In another optional implementation, the synchronization information table is located on the media player. On this basis, the media control instruction includes at least the information about the current pose of the media player. How the media player controls playback of the media data according to the media control instruction and the synchronization information table is not described in detail herein and will be described below.

It can be learned that, the media control instruction is used to instruct to control playback of the media data according to the target playback mode. For example, the media control instruction includes information about the target playback mode, or the media control instruction includes information about the current pose of the media player. Both types of information can instruct to control playback of the media data according to the target playback mode. When the media control instruction includes the information about the target playback mode, the media player may determine the target playback mode based on the information, and the media player consumes less power. When the media control instruction includes the information about the current pose of the media player, the driving controller consumes less power.

In step 302, the driving controller sends the pose adjustment instruction to the pose adjustment mechanism, such that the pose adjustment mechanism adjusts the pose of the media player in response to the pose adjustment instruction; and the driving controller sends the media control instruction to the media player, such that the media player controls playback of the media data in response to the media control instruction.

Corresponding to the first embodiment of step 301 above, the driving controller generates the pose adjustment instruction and the media control instruction in response to the received trigger instruction. In step 302, the media playback system shown in FIG. 1 is used an example. In an optional implementation, the driving controller 101 may send the generated pose adjustment instruction and media control instruction simultaneously, such that the pose adjustment mechanism 102 adjusts the pose of the media player 103 in response to the pose adjustment instruction, and the media player 103 controls playback of the media data in response to the media control instruction. In this way, the pose of the media player and playback of the media data are controlled simultaneously.

The interface shown in FIG. 4 is used as an example. It is assumed that the driving controller 101 receives, in step 301, a trigger instruction for instructing to start adjusting the pose of the media player. Further, the driving controller 101 may generate the pose adjustment instruction for instructing to start adjusting the pose of the media player and the media control instruction for instructing the media player to start playing the media data. According to the above description, the driving controller sends the pose adjustment instruction and the media control instruction simultaneously, the pose adjustment mechanism 102 starts to adjust the pose of the media player 103 when receiving the pose adjustment instruction, and the media player 103 starts to play the media data when receiving the media control instruction. Thus, the media player 103 plays the media data while adjusting the pose.

It is assumed that the driving controller 101 receives, in step 301, a trigger instruction for instructing to stop adjusting the pose of the media player. Further, the driving controller 101 may generate the pose adjustment instruction for instructing to stop adjusting the pose of the media player and the media control instruction for instructing the media player to stop playing the media data. According to the above description, the driving controller 101 sends the pose adjustment instruction and the media control instruction simultaneously, the pose adjustment mechanism 102 stops adjusting the pose of the media player 103 when receiving the pose adjustment instruction, and the media player 103 stops playing the media data when receiving the pose adjustment instruction. Thus, the media player 103 stops adjusting the pose and stops playing the media data simultaneously.

It should be noted that the pose adjustment mechanism stops adjusting the pose of the media player when receiving the pose adjustment instruction for instructing to stop adjusting the pose of the media player is only an example. During application, the pose adjustment mechanism may continue to adjust the pose of the media player when receiving the pose adjustment instruction for instructing to stop adjusting the pose of the media player, and stops adjusting the pose of the media player after the media player achieves the preset zero pose (that is, the initial pose).

The interface shown in FIG. 5 is used as an example. It is assumed that the driving controller 101 receives, in step 301, a trigger instruction for instructing to start adjusting the pose of the media player. The driving controller 101 may generate the pose adjustment instruction for instructing to start adjusting the pose of the media player and the media control instruction for instructing the media player to start playing the media data. According to the above description, the driving controller sends the pose adjustment instruction and the media control instruction simultaneously, the pose adjustment mechanism 102 starts to adjust the pose of the media player 103 when receiving the pose adjustment instruction, and the media player 103 starts to play the media data when receiving the media control instruction. Thus, the media player 103 plays the media data while adjusting the pose.

It is assumed that the driving controller 101 receives, in step 301, a trigger instruction for instructing to pause adjusting the pose of the media player. The driving controller 101 may generate the pose adjustment instruction for instructing to pause adjusting the pose of the media player and the media control instruction for instructing the media player to pause playing the media data. According to the above description, the driving controller 101 sends the pose adjustment instruction and the media control instruction simultaneously, the pose adjustment mechanism 102 pauses adjusting the pose of the media player 103 when receiving the pose adjustment instruction, and the media player 103 pauses playing the media data when receiving the media control instruction. Thus, the media player 103 pauses adjusting the pose and pauses playing the media data simultaneously.

It is assumed that the driving controller 101 receives, in step 301, a trigger instruction for instructing to stop adjusting the pose of the media player. The driving controller 101 may generate the pose adjustment instruction for instructing to end adjusting the pose of the media player and the media control instruction for instructing the media player to stop playing the media data. According to the above description, the driving controller 101 sends the pose adjustment instruction and the media control instruction simultaneously, the pose adjustment mechanism 102 may continue to adjust the pose of the media player when receiving the pose adjustment instruction, and stops adjusting the pose of the media player after the media player achieves the preset zero pose (that is, the initial pose). The media player 103 ends playing of media data when receiving the pose adjustment instruction.

As described above, each time receiving the pose adjustment instruction for instructing to start adjusting the pose of the media player, the pose adjustment mechanism adjusts the pose of the media player from the preset zero pose based on the preset pose change cycle. Further, when receiving the pose adjustment instruction for instructing to stop or end adjusting the pose of the media player, the pose adjustment mechanism may not immediately stop adjusting the pose of the media player, but continue to complete a current pose change cycle and then stop adjusting the pose of the media player.

In another optional implementation, the driving controller 101 may first send the pose adjustment instruction to the pose adjustment mechanism 102, such that the pose adjustment mechanism 102 adjusts the pose of the media player 103. When the pose adjustment mechanism 102 adjusts the pose of the media player 103, the driving controller 102 sends the generated media control instruction to the media player 103, such that the media player 103 controls playback of the media data in response to the media control instruction. In this way, the pose of the media player and playback of the media data are controlled asynchronously.

For example, when the pose adjustment mechanism 102 adjusts the pose of the media player 103 according to the pose adjustment instruction, the pose sensor detects the pose of the media player 103 in real time and sends the pose feedback information to the driving controller 101 based on the detected pose, wherein the pose feedback information includes at least the information about the current pose of the media player 103. After receiving the pose feedback information, the driving controller 101 extracts the information about the current pose of the media player 103 from the pose feedback information. When determining, based on the information about the current pose of the media player 103, that the media player 103 is at a pose in the pose set, the driving controller 101 sends (for example, obtains and sends) the media control instruction to the media player 103.

For example, it is assumed that the driving controller receives, in step 301, a trigger instruction for instructing to start adjusting the pose of the media player. Further, the driving controller may generate the pose adjustment instruction for instructing to start adjusting the pose of the media player and the media control instruction for instructing the media player to start playing the media data. According to the above description, the driving controller first sends the pose adjustment instruction to the pose adjustment mechanism, such that the pose adjustment mechanism adjusts the pose of the media player. When detecting that the media player is at a pose in the pose set, the driving controller sends the media control instruction to the media player, such that the media player starts playing the media data. Thus, the media player first adjusts the pose to the pose in the pose set, and then starts playing the media data.

The media playback system shown in FIG. 2 is stilled used as an example. In step 302, the driving controller 201 may send the generated pose adjustment instructions to the pose adjustment mechanism 202 and the pose adjustment mechanism 203 simultaneously, such that the pose adjustment mechanism 202 and the pose adjustment mechanism 203 simultaneously adjust the pose of the media player 204 and the pose of the media player 205 respectively. The pose adjustment mechanism 202 adjusts the pose of the media player 204 and the pose adjustment mechanism 203 adjusts the pose of the media player 205. In this way, poses of a plurality of media players in the media playback system are adjusted synchronously. Similarly, the driving controller 201 may send the generated media control instructions to the media player 204 and the media player 205 simultaneously, such that the media player 204 and the media player 205 control playback of the media data synchronously. In this way, a plurality of media players in the media playback system control playback of the media data synchronously.

Corresponding to the second embodiment in step 301 above, the driving controller generates the media control instructions when the pose adjustment mechanism adjusts the poses of the media players according to the pose adjustment instructions. In step 302, the driving controller may send the media control instructions to the media players immediately after generating the media control instructions.

Further, it can be learned from the above description, in an optional implementation, the media control instruction corresponds to the target playback mode and is used to instruct the media player to control playback of the media data according to the target playback mode. On this basis, the media player may extract, after receiving the media control instruction, the information about the target playback mode from the media control instruction and control playback of the media data according to the target playback mode.

In another optional implementation, the synchronization signal includes at least the information about the current pose of the media player, and the synchronization information table is located on the media player. On this basis, after receiving the media control instruction, the media player may extract the information about the current pose from the media control instruction, search the preset synchronization information table for the target playback mode corresponding to the current pose, and control playback of the media data according to the target playback mode.

For example, the target playback mode is frame skipping playback or source switching. That the media player controls playback of the media data according to the target playback mode includes: the media player starts playing the media data from the target video frame corresponding to the target playback mode. For frame skipping playback, the target video frame is a video frame in the source (video) currently being played by the media player; for video source switching, the target video frame is a video frame in another source (a video other than the currently playing video).

It can be learned from the above description that the driving controller may send the media control instruction to the media player in various ways. For example, the driving controller may send the media control instruction to the media player while sending the pose adjustment instruction to the pose adjustment mechanism. For another example, the driving controller sends the media control instruction to the media player based on the current pose of the media player after sending the pose adjustment instruction to the pose adjustment mechanism. When the driving controller sends the media control instruction to the media player based on the current pose of the media player, the media control instruction may match the current pose of the media player, thereby improving the playback effect of the media player.

According to the technical solutions provided in the embodiments of the present disclosure, the pose adjustment mechanism is added to the media playback system, such that the pose adjustment mechanism can adjust the pose of the media player. Further, the driving controller generates the pose adjustment instruction and the media control instruction, sends the pose adjustment instruction to the pose adjustment mechanism and sends the media control instruction to the media player. In this way, the pose of the media player is adjusted and playback of the media data by the media player is controlled through simple control operations, thereby enriching functions of the media playback system. This simplifies the user operation and enhances the user operating experience.

Figure 6:
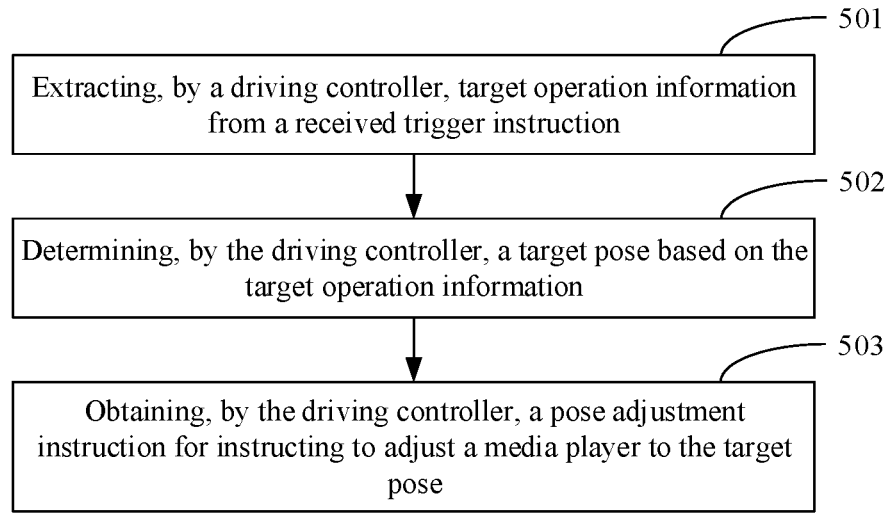
FIG. 6 is a flowchart of another method of playback control according to an embodiment of the present disclosure.

FIG. 6 is a flowchart of another method of playback control according to an embodiment of the present disclosure. Based on the procedure shown in FIG. 3, the procedure shown in FIG. 6 describes a process in which a driving controller generates a pose adjustment instruction in response to a received trigger instruction. As shown in FIG. 6, the procedure may include the following steps:

In step 501, the driving controller extracts target operation information from a received trigger instruction.

In step 502, the driving controller determines a target pose based on the target operation information.

Steps 501 and 502 are described below.

In an embodiment, it can be learned from the above description that each time receiving a pose adjustment instruction for instructing to start adjusting a pose of a media player, a pose adjustment mechanism adjusts the pose of the media player from a preset zero pose based on a preset pose change cycle. When receiving a pose adjustment instruction for instructing to stop (or end) adjusting the pose of the media player, the pose adjustment mechanism continues to complete a current pose change cycle and then stops adjusting the pose of the media player. Further, in this embodiment, the target operation information may include at least an action instruction, including, but not limited to, an action instruction for instructing to start adjusting the pose of the media player, an action instruction for instructing to stop (or end) adjusting the pose of the media player, or the like. It can be learned that the target operation information is used to instruct an operation on the pose of the media player. On this basis, the driving controller determines a current pose of the media player in response to the action instruction in the target operation information, searches a pose list corresponding to the pose change cycle for a pose after the current pose, and uses the found pose as the target pose. That the pose list corresponds to the pose change cycle means that the pose list includes all poses in the pose change cycle.

For example, it is assumed that the user triggers, when the media player is static, the first function button from left to right in FIG. 4, that is, the function button for instructing a control operation of starting adjusting the pose of the media player. The target operation information in the trigger instruction includes the action instruction for instructing to start adjusting the pose of the media player. Further, in response to the action instruction, the driving controller determines that the current pose of the media player is the zero pose. According to the above description, the driving controller determines, as target poses, the poses 1 and 2 in the pose list after the zero pose.

For another example, it is assumed when the media player adjusts the pose from the zero pose based on the preset pose change cycle, the user triggers the second function button from left to right in FIG. 4, that is, the function button for instructing the control operation of stopping adjusting the pose of the media player. The target operation information in the trigger instruction includes the action instruction for instructing to stop adjusting the pose of the media player. Further, in response to the action instruction, the driving controller determines the current pose of the media player (which is supposed to be the pose 1). According to the above description, the driving controller determines, as the target pose, the pose 2 in the pose list after the pose 1.

Figure 8:
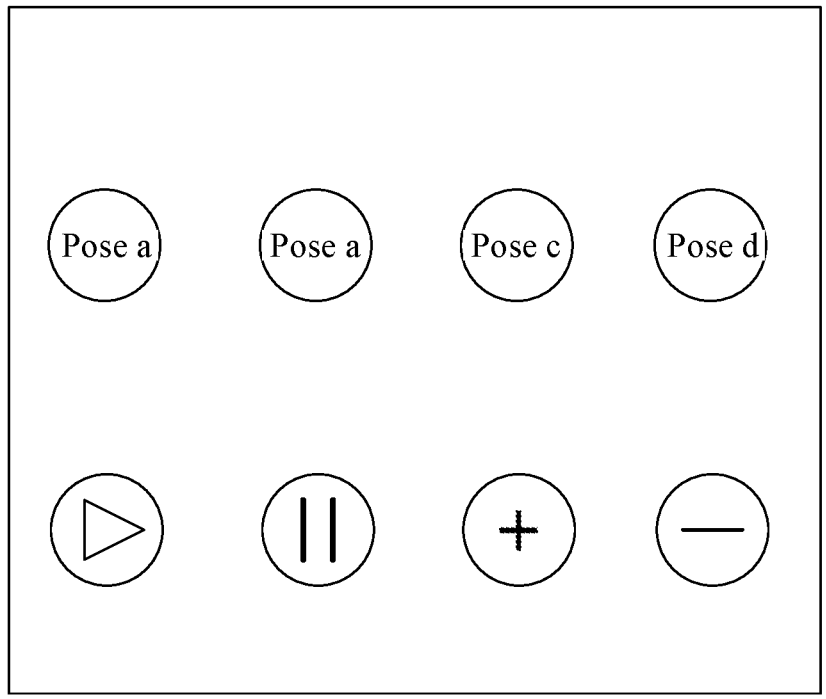
FIG. 8 is another schematic diagram of a control interface.

In another embodiment, FIG. 8 is another schematic diagram of the foregoing control interface. On the basis of the control interface shown in FIG. 4, the control interface shown in FIG. 8 may include a plurality of selectable pose buttons, each corresponding to one pose. For example, the media player is a display module, and the plurality of selectable pose buttons include, but are not limited to: a pose button corresponding to a landscape splicing pose of a plurality of display modules (pose a in FIG. 8), a pose button corresponding to a portrait splicing pose of a plurality of display modules (pose b in FIG. 8), a pose button corresponding to a back-to-back landscape pose of a plurality of display modules (pose c in FIG. 8), and a pose button corresponding to a back-to-back portrait pose of a plurality of display modules (pose d in FIG. 8).

On this basis, during application, the user may trigger any of the pose buttons and then trigger the first function button from left to right in FIG. 8, to instruct to control the media player to adjust to a pose of the media player in poses corresponding to the triggered pose button. It can be learned that the operation information may include the information about the target pose and the action instruction. The target pose is the pose of the media player in the poses corresponding to the triggered pose button, and the action instruction is used to instruct to adjust the pose of the media player to the pose of the media player in the poses corresponding to the triggered pose button. On this basis, the driving controller may extract the information about the target pose from the target operation information.

It can be learned that the trigger instruction can indicate the target pose (for example, the target operation information in the trigger instruction is used to indicate the target pose). For example, the trigger instruction includes the information about the target pose, and the driving controller can determine the target pose based on the information about the target pose. For another example, the trigger instruction does not include the information about the target pose, and the driving controller may determine as the target pose at least one pose in the pose list after the current pose of the media player. In this embodiment of the present disclosure, the driving controller may send, to the pose adjustment mechanism according to instruction of the trigger instruction, the pose adjustment instruction for instructing to adjust the pose of the media player to the target pose.

In step 503, the driving controller obtains the pose adjustment instruction for instructing to adjust the media player to the target pose.

In an embodiment, it can be learned from the above description that the driving controller may determine as the target pose each pose in the preset pose list after the current pose of the media player, that is, there may be one or more target poses. On this basis, the driving controller may sequentially obtain (for example, generate), in the sequence of the target poses in the pose list, pose adjustment instructions for instructing to adjust the media player to the target poses.

For example, assuming that the current pose of the media player is the zero pose, the driving controller first obtains a pose adjustment instruction for instructing to adjust the media player to the pose 1; when the media player is adjusted to the pose 1, the driving controller obtains a pose adjustment instruction for instructing to adjust the media player to the pose 2; and when the media player is adjusted to the pose 2, the driving controller obtains a pose adjustment instruction for instructing to adjust the media player to the zero pose, and so on.

It can be learned that in this embodiment, the driving controller continuously sends the pose adjustment instructions to the media player. For example, the driving controller sequentially sends, to the pose adjustment mechanism in the sequence of the at least one pose (which is the target pose) in the pose list, at least one pose adjustment instruction in a one-to-one correspondence with the at least one pose. The pose adjustment instruction corresponding to one of the at least one pose is used to instruct to adjust the pose of the media player to the pose.

In this embodiment, in an optional implementation, a change process between two adjacent poses may be preset. For example, the three poses shown in FIG. 7 are used as an example. Table 2 shows as an example of the pose change process.

TABLE 2

| | |
|---|---|
| Changing from the zero pose to the pose 1 | A display module rotates 90° clockwise on the vertical plane (parallel to the support rod), and the other display module rotates 90° counterclockwise on the vertical plane, and then rotates 180° counterclockwise on the horizontal plane (perpendicular to the support rod). Finally, the two display modules are in landscape mode and are arranged up and down in the same plane. |
| Changing from the pose 1 to the pose 2 | The upper display module rotates 180° counterclockwise on the horizontal plane, and finally the two display modules are in landscape mode and are arranged up and down in different planes. |
| Changing from the pose 2 to the zero pose | The upper display module rotates 90° counterclockwise on the vertical plane, and the lower display module rotates 90° clockwise on the vertical plane. Finally, the two display modules are in portrait mode back-to-back. |

In the above Table 2, for example, the pose 1 means starting from the zero pose. A display module rotates 90° clockwise on the vertical plane (parallel to the support rod), and the other display module rotates 90° counterclockwise on the vertical plane (perpendicular to the support rod), and then rotates 180° counterclockwise on the horizontal plane. Finally, the pose 1 is achieved, that is, the two display modules are in landscape mode and are arranged up and down in the same plane.

For another example, the zero pose means starting from the pose 2. The upper display module rotates 90° counterclockwise on the vertical plane, and the lower display module rotates 90° clockwise on the vertical plane. Finally, the zero pose is achieved, that is, the two display modules are in portrait mode back-to-back.

On this basis, in this embodiment of the present disclosure, the pose adjustment instruction is used to instruct the media player to adjust to the target pose according to the corresponding pose change process.

Through the procedure shown in FIG. 6, the driving controller obtains the pose adjustment instruction in response to the received trigger instruction.

Figure 9:
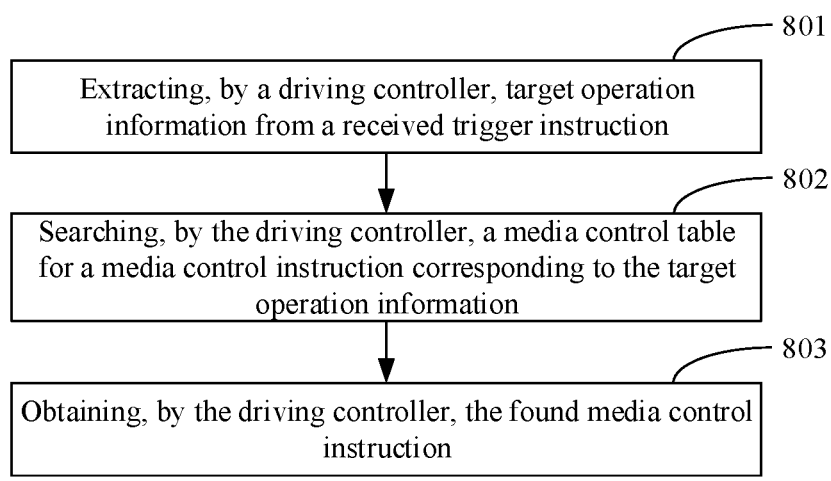
FIG. 9 is a flowchart of another method of playback control according to an embodiment of the present disclosure.

FIG. 9 is a flowchart of another method of playback control according to an embodiment of the present disclosure. Based on the procedure shown in FIG. 3, the procedure shown in FIG. 9 describes a process in which a driving controller obtains a media control instruction in response to a received trigger instruction of a control operation. As shown in FIG. 9, the procedure may include the following steps:

In step 801, the driving controller extracts target operation information from a received trigger instruction.

In step 802, the driving controller searches a media control table for a media control instruction corresponding to the target operation information.

In step 803, the driving controller obtains the found media control instruction.

Steps 801 to 803 are described below.

The media control table includes a correspondence between operation information and control instructions. Table 3 shows an example of the media control table.

TABLE 3

| Operation information | Control instructions |
|---|---|
| Used to instruct to start adjusting a pose of a media player | Used to instruct to start to play media data |
| Used to instruct to stop adjusting a pose of a media player | Used to instruct to stop playing media data |

On this basis, the driving controller may search the media control table shown in Table 3 for a media control instruction corresponding to the extracted target operation information, and then obtain the media control instruction.

Through the procedure shown in FIG. 9, the driving controller obtains the media control instruction in response to the received trigger instruction of the control operation.

It can be learned that the trigger instruction includes the target operation information used to instruct an operation on the pose of the media player, and the driving controller may send the media control instruction corresponding to the target operation information to the media player based on the correspondence between operation information and control instructions, such that pose adjustment of the media player is associated with playback of the media data. Certainly, the driving controller may alternatively obtain the media control instruction without the target operation information. For example, the media control instruction is configured by the staff on the driving controller, and the driving controller directly obtains the media control instruction. This is not limited in this embodiment of the present disclosure.

Optionally, the media control instruction may include specified media data to be played, such that the media player can play the media data according to the media control instruction, thereby achieving playback of the specified media data.

In addition, in this embodiment of the present disclosure, when the media playback system includes two or more (a plurality of) media players, in an embodiment, obtaining the media control instruction may further include obtaining media control instructions for instructing the plurality of media players to play the same media data (for example, a video, a source), such that the two or more media players may play the source independently without affecting each other.

Further, the driving controller may detect whether the display screens of the two or more media players are synchronized; and if not, adjust the display screens of the two or more media players to be synchronized.

Optionally, the driving controller may detect, in real time or periodically, whether the display screens of the two or more media players are synchronized.

Optionally, adjusting the display screens of the two or more media players to be synchronized may include: controlling a media player with a slower playback progress to skip to a video frame currently being played by a media player with a faster playback progress; or controlling a media player with a slower playback progress to play fast forward at a specific rate until the display screens of the two or more media players are adjusted to be synchronized, and then controlling the media player with a slower playback progress to play at a normal speed; or controlling a media player with a faster playback progress to pause playback until a media player with a slower playback progress reaches a current playback progress of the faster media player; or controlling a media player with a faster playback progress to play at a specific slow rate until the display screens of the two or more media players are adjusted to be synchronized, and then controlling the media player with a faster playback progress to play at a normal speed.

In another embodiment, generating the media control instruction may further include: generating media control instructions for instructing all the media players to play matching media data. Each piece of the media data is a video, and matching herein means that video frames with the same frame number in the video played by all the media players may be spliced to form a complete image.

Further, in this embodiment, the driving controller may further determine a playback progress of each media player, detect whether a playback progress of a slave media player is consistent with a playback progress of a master media player; and if not, control the playback progress of the slave media player to be consistent with the playback progress of the master media player.

Optionally, the two or more media players include one master media player, and the rest are slave media players.

Optionally, the driving controller may determine the playback progress of each media player in real time or periodically, and detect whether the playback progress of the slave media player is consistent with the playback progress of the master media player.

Optionally, controlling the playback progress of the slave media player to be consistent with the playback progress of the master media player may include: controlling a media player with a slower playback progress to skip to a video frame currently being played by a media player with a faster playback progress; or controlling a media player with a slower playback progress to play fast forward at a specific rate until the playback progress of the slave media player is consistent with the playback progress of the master media player, and then controlling the media player with a slower playback progress to play at a normal speed; or controlling a media player with a faster playback progress to pause playback until a media player with a slower playback progress reaches a current playback progress of the faster media player; or controlling a media player with a faster playback progress to play at a specific slow rate until the playback progress of the slave media player is consistent with the playback progress of the master media player, and then controlling the media player with a faster playback progress to play at a normal speed.

It can be learned that the media playback system may include a plurality of pose adjustment mechanisms and a plurality of media players which are in a one-to-one correspondence, and the pose adjustment mechanisms each are used to adjust a pose of a corresponding media players. In this case, the driving controller may send the pose adjustment instruction to each of the plurality of pose adjustment mechanisms and send the media control instruction to each of the plurality of media players. The pose adjustment instruction sent to each pose adjustment mechanism is used to instruct the pose adjustment mechanism to adjust the pose of the corresponding media player.

In addition, when the media playback system includes a plurality of pose adjustment mechanisms and a plurality of media players which are in a one-to-one correspondence, the driving controller may send pose adjustment instructions to the plurality of pose adjustment mechanisms simultaneously and send media control instructions to the plurality of media players simultaneously. Certainly, the driving controller may alternatively not send pose adjustment instructions to the plurality of pose adjustment mechanisms simultaneously and not send media control instructions to the plurality media players simultaneously. This is not limited in this embodiment of the present disclosure.

When the media playback system includes a plurality of media players, the media control instruction is used to instruct to play the media data, and the plurality of media control instructions sent by the driving controller to the plurality of media players indicate the same media data. Alternatively, the plurality of media control instructions sent by the driving controller to the plurality of media players indicate different pieces of media data.

Optionally, when the plurality of media control instructions sent by the driving controller to the plurality of media players indicate different pieces of media data, if each piece of the media data is a video, video frames with the same serial number in pieces of the media data indicated by the plurality of media control instructions may be obtained by segmenting the same image, thereby realizing splicing display. Certainly, these video frames may not be obtained by segmenting the same image. This is not limited in this embodiment of the present disclosure.

When the media playback system includes a plurality of pose adjustment mechanisms and a plurality of media players which are in a one-to-one correspondence, if playback progresses of the plurality of media players are unsynchronized, the driving controller may send a playback progress adjustment instruction to at least one media player to synchronize the playback progresses of the plurality of media players. Certainly, when the playback progresses of the plurality of media players are unsynchronized, the driving controller may alternatively not send the playback progress adjustment instruction.

In addition, when the media playback system includes a plurality of pose adjustment mechanisms and a plurality of media players which are in a one-to-one correspondence, the pose adjustment instructions sent by the driving controller to different pose adjustment mechanisms may be the same or different, and correspondingly, these pose adjustment instructions may be used to instruct the plurality of media players to adjust to the same target pose or different target poses.

Figure 10:
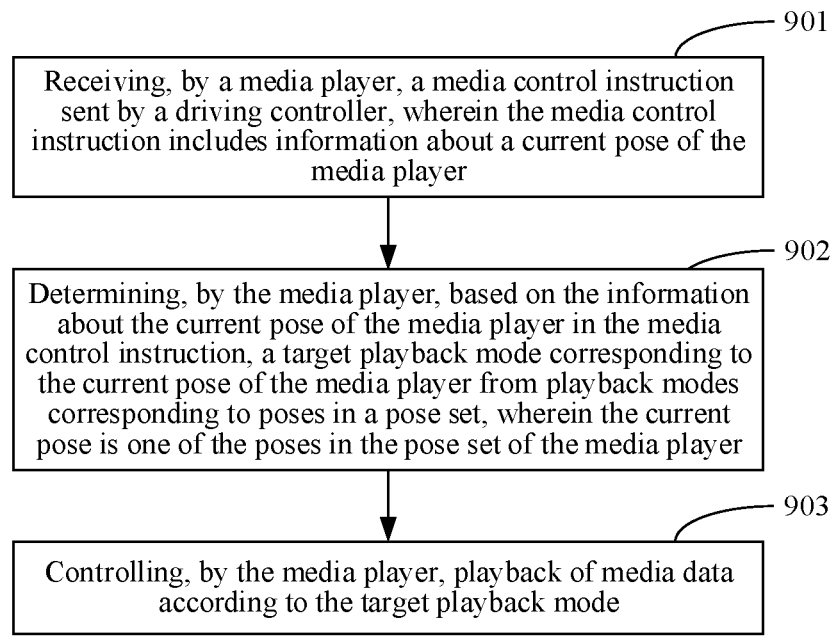
FIG. 10 is a flowchart of another method of playback control according to an embodiment of the present disclosure.

An embodiment of the present disclosure further provides a method of playback control. The method is performed by a media player in a media playback system, the media playback system further includes a pose adjustment mechanism and a driving controller, and the pose adjustment mechanism is configured to adjust a pose of the media player. As shown in FIG. 10, the method includes:

In step 901, the media player receives a media control instruction sent by the driving controller, wherein the media control instruction includes information about a current pose of the media player.

In step 902, the media player determines, based on the information about the current pose of the media player in the media control instruction, a target playback mode corresponding to the current pose of the media player from playback modes corresponding to poses in a pose set, wherein the current pose is one of the poses in the pose set of the media player.

In step 903, the media player controls playback of media data according to the target playback mode.

For the process in which the media player determines the target playback mode corresponding to the current pose of the media player, refer to the process in which the driving controller determines the target playback mode corresponding to the current pose of the media player in the above-described embodiments. Details are not described herein in this embodiment of the present disclosure.

After receiving the media control instruction, the media player may control playback of the media data according to the instruction of the media control instruction.

Figure 11:
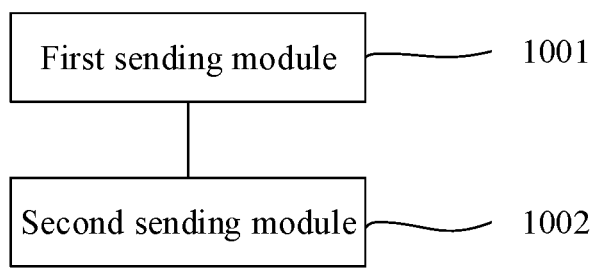
FIG. 11 is a block diagram of a playback control apparatus according to an embodiment of the present disclosure.

FIG. 11 is a block diagram of a playback control apparatus according to an embodiment of the present disclosure. The playback control apparatus may be the driving controller in the media playback system described above. As shown in FIG. 11, the apparatus includes:

a first sending module 1001, configured to send a pose adjustment instruction to a pose adjustment mechanism, wherein the pose adjustment instruction is used to instruct to adjust a pose of a media player; and a second sending module 1002, configured to send a media control instruction to the media player, wherein the media control instruction is used to instruct to control playback of media data.

Optionally, the media player includes a display module, and the media data includes an image.

Optionally, the playback control apparatus satisfies any of the following conditions:

the second sending module 1002 is configured to send the media control instruction to the media player while sending the pose adjustment instruction to the pose adjustment mechanism; and the second sending module 1002 is configured to send the media control instruction to the media player based on a current pose of the media player after sending the pose adjustment instruction to the pose adjustment mechanism.

Optionally, the media playback system further includes a pose sensor, and the second sending module 1002 is configured to:

receive pose feedback information sent by the pose sensor, wherein the pose feedback information is used to indicate the current pose of the media player; and send the media control instruction to the media player based on the current pose of the media player indicated by the pose feedback information.

Optionally, the second sending module 1002 is configured to:

send the media control instruction to the media player based on the current pose of the media player when the current pose of the media player belongs to a pose set.

Optionally, the media control instruction is used to instruct to control playback of the media data according to a target playback mode; and the target playback mode is one of playback modes corresponding to poses in the pose set, and the target playback mode corresponds to the current pose.

Optionally, the playback control apparatus satisfies at least one of the following conditions:

the media control instruction includes either of the following information: information about the target playback mode and information about the current pose; and the media player includes a display module and the media data includes a video; and the target playback mode includes a mode of playing the media data starting at a target video frame, wherein the target video frame belongs to a currently playing video of the media player, or the target video frame belongs to a video other than the currently playing video.

Optionally, the playback control apparatus further includes a receiving module (not shown in FIG. 11), configured to receive a trigger instruction;

the first sending module 1001 is configured to send the pose adjustment instruction to the pose adjustment mechanism in response to the trigger instruction; and the second sending module 1002 is configured to send the media control instruction to the media player in response to the trigger instruction.

Optionally, the trigger instruction is used to indicate a target pose, and the first sending module 1001 is configured to:

determine the target pose indicated by the trigger instruction; and send the pose adjustment instruction to the pose adjustment mechanism, wherein the pose adjustment instruction is used to instruct to adjust the pose of the media player to the target pose.

Optionally, the playback control apparatus satisfies any of the following conditions:

the trigger instruction includes information about the target pose, and the first sending module 1001 is configured to determine the target pose based on the information about the target pose; and the first sending module 1001 is configured to: determine at least one pose in a pose list after the current pose of the media player as the target pose; and send at least one pose adjustment instruction in a one-to-one correspondence with the at least one pose to the pose adjustment mechanism in a sequence of the at least one pose in the pose list, wherein the pose adjustment instruction is used to instruct to adjust the pose of the media player to a corresponding pose.

Optionally, the trigger instruction includes target operation information for instructing an operation on the pose of the media player, and the second sending module 1002 is configured to:

send the media control instruction corresponding to the target operation information to the media player based on a correspondence between operation information and control instructions.

Optionally, the media playback system includes a plurality of pose adjustment mechanisms and a plurality of media players which are in a one-to-one correspondence, and each of the pose adjustment mechanisms is configured to adjust a pose of a corresponding media player;

Optionally, the playback control apparatus satisfies at least one of the following conditions:

the first sending module 1001 is configured to send pose adjustment instructions to the plurality of pose adjustment mechanisms simultaneously; and the second sending module 1002 is configured to send media control instructions to the plurality of media players simultaneously;

the media control instruction is used to instruct to play the media data, and the plurality of media control instructions sent by the driving controller to the plurality of media players satisfy either of the following conditions: the plurality of media control instructions indicate the same media data; and, the plurality of media control instructions indicate different pieces of media data, wherein each piece of the media data is a video, and video frames with the same serial number in pieces of the media data indicated by the plurality of media control instructions are obtained by segmenting the same image; and the playback control apparatus further includes a third sending module (not shown in FIG. 11) configured to send a playback progress adjustment instruction to at least one media player when playback progresses of the plurality of media players are unsynchronized, to synchronize the playback progresses of the plurality of media players.

Figure 12:
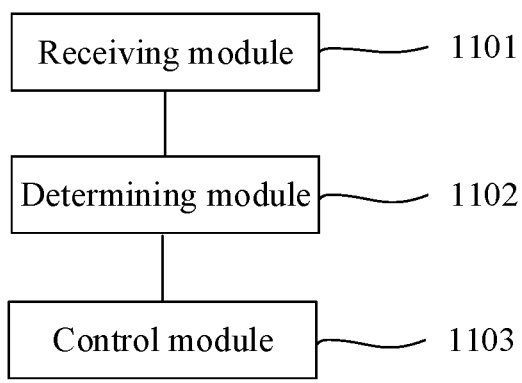
FIG. 12 is a block diagram of another playback control apparatus according to an embodiment of the present disclosure.

FIG. 12 is a block diagram of another playback control apparatus according to an embodiment of the present disclosure. The playback control apparatus may be the media player in the media playback system described above. As shown in FIG. 12, the playback control apparatus includes:

a receiving module 1101, configured to receive a media control instruction sent by a driving controller, wherein the media control instruction includes information about a current pose of the media player;

a determination module 1102, configured to determine, based on the information about the current pose in the media control instruction, a target playback mode corresponding to the current pose from playback modes corresponding to poses in a pose set, wherein the current pose is one of the poses in the pose set; and a control module 1103, configured to control playback of media data according to the target playback mode.

Corresponding to the previously described embodiments of the method of playback control, a media playback system provided in the embodiments of the present disclosure is further described below with reference to the media playback system shown in FIG. 1.

The media playback system provided in the embodiments of the present disclosure includes: a driving controller, a pose adjustment mechanism, and a media player.

the driving controller is configured to send a pose adjustment instruction to the pose adjustment mechanism, wherein the pose adjustment instruction is used to instruct to adjust a pose of the media player;

the driving controller is further configured to send a media control instruction to the media player, wherein the media control instruction is used to instruct to control playback of media data;

the pose adjustment mechanism is configured to adjust the pose of the media player according to the pose adjustment instruction; and the media player is configured to control playback of the media data according to the media control instruction.

Optionally, the media player includes a display module, and the media data includes an image.

Optionally, the playback control system satisfies any of the following conditions:

the driving controller is configured to send the media control instruction to the media player while sending the pose adjustment instruction to the pose adjustment mechanism; and the driving controller is configured to send the media control instruction to the media player based on a current pose of the media player after sending the pose adjustment instruction to the pose adjustment mechanism.

Optionally, the media playback system further includes a pose sensor, the pose sensor is configured to detect a current pose of the media player and send pose feedback information to the driving controller, wherein the pose feedback information is used to indicate the current pose of the media player;

the driving controller is configured to: receive the pose feedback information sent by the pose sensor, and send the media control instruction to the media player based on the current pose of the media player indicated by the pose feedback information.

Optionally, the driving controller is configured to send the media control instruction to the media player based on the current pose of the media player when the current pose of the media player belongs to a pose set.

Optionally, the media control instruction is used to instruct to control playback of the media data according to a target playback mode; and the target playback mode is one of playback modes corresponding to poses in the pose set, and the target playback mode corresponds to the current pose.

Optionally, the playback control system satisfies at least one of the following conditions:

the media control instruction includes either of the following information: information about the target playback mode and information about the current pose; and the media player includes a display module and the media data includes a video; and the target playback mode includes a mode of playing the media data starting at a target video frame, wherein the target video frame belongs to a currently playing video of the media player, or the target video frame belongs to a video other than the currently playing video.

Optionally, the driving controller is configured to: receive a trigger instruction; send the pose adjustment instruction to the pose adjustment mechanism in response to the trigger instruction; and send the media control instruction to the media player in response to the trigger instruction.

Optionally, the media playback system further includes a control device, wherein the control device is configured to send the trigger instruction to the driving controller.

Optionally, the trigger instruction is used to indicate a target pose, and the driving controller is configured to:

determine the target pose indicated by the trigger instruction; and send the pose adjustment instruction to the pose adjustment mechanism, wherein the pose adjustment instruction is used to instruct to adjust the pose of the media player to the target pose.

Optionally, the playback control system satisfies any of the following conditions:

the trigger instruction includes information about the target pose, and determining the target pose indicated by the trigger instruction includes: determining the target pose based on the information about the target pose; and the driving controller is configured to determine at least one pose in a pose list after the current pose of the media player as the target pose; send at least one pose adjustment instruction in a one-to-one correspondence with the at least one pose to the pose adjustment mechanism in a sequence of the at least one pose in the pose list, wherein the pose adjustment instruction is used to instruct to adjust the pose of the media player to a corresponding pose.

Optionally, the trigger instruction includes target operation information for instructing an operation on the pose of the media player, and the driving controller is configured to:

send the media control instruction corresponding to the target operation information to the media player based on a correspondence between operation information and control instructions.

Optionally, the media playback system includes a plurality of pose adjustment mechanisms and a plurality of media players which are in a one-to-one correspondence, and each of the pose adjustment mechanisms is configured to adjust a pose of a corresponding media player;

Optionally, the playback control system satisfies at least one of the following conditions:

the driving controller is configured to: send the pose adjustment instructions to a plurality of pose adjustment mechanisms simultaneously, and send the media control instructions to a plurality of media players simultaneously;

the media control instruction is used to instruct to play the media data, and the plurality of media control instructions sent by the driving controller to the plurality of media players satisfy either of the following conditions: the plurality of media control instructions indicate the same media data; and, the plurality of media control instructions indicate different pieces of media data, wherein each piece of the media data is a video, and video frames with the same serial number in pieces of the media data indicated by the plurality of media control instructions are obtained by segmenting the same image; and the driving controller is configured to send a playback progress adjustment instruction to at least one media player when playback progresses of the plurality of media players are unsynchronized, to synchronize the playback progresses of the plurality of media players. the media player is configured to adjust the playback progress of the media data according to the received playback progress adjustment instruction.

Figure 13:
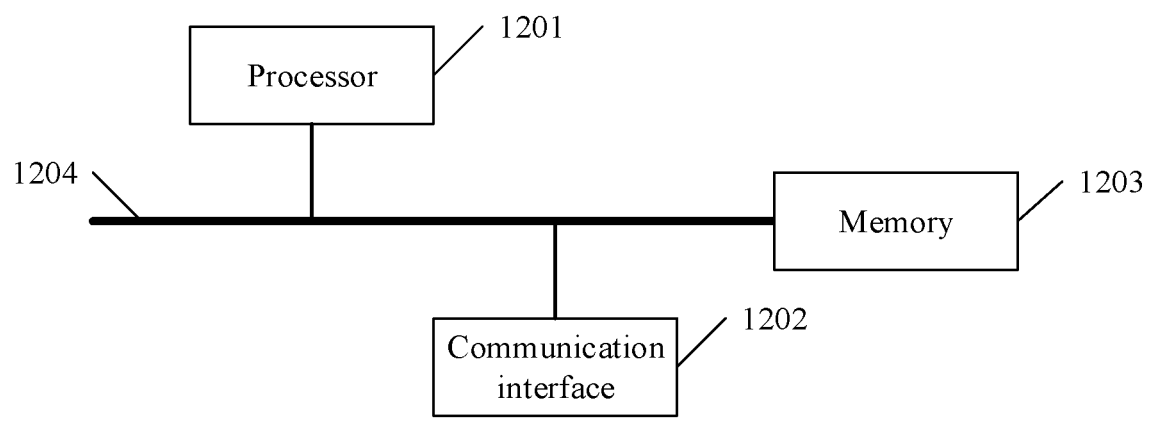
FIG. 13 is a schematic structural diagram of an electronic device according to an embodiment of the present disclosure.

Referring to FIG. 13, an embodiment of the present disclosure further provides an electronic device, including a processor 1201, a communication interface 1202, a memory 1203, and a communication bus 1204. The processor 1201, the communication interface 1202, and the memory 1203 communicate with each other through the communication bus 1204.

The memory 1203 is configured to store a computer program.

In an embodiment of the present disclosure, the processor 1201 is configured to execute the program stored on the memory 1203, to implement the method of playback control performed by the driving controller or the media player in any of the foregoing method embodiments.

An embodiment of the present disclosure further provides a storage medium (computer readable storage medium). The storage medium stores one or more programs. The storage medium may include a volatile memory, such as a random-access memory (RAM); or the storage medium may include a non-volatile memory, such as a read-only memory (ROM), a flash memory, a hard disk drive, or a solid-state drive; or the storage medium may include a combination of the foregoing types of memories.

The one or more programs in the storage medium may be executed by one or more processors to implement the method of playback control performed at the driving controller or the media player.

The processor is configured to execute control programs of the media playback system stored in the memory, to implement the method of playback control performed at the driving controller or the media player.

Those of ordinary skill in the art may realize that, the modules of the examples and the steps of the algorithms described in the embodiments of the present disclosure can be implemented with electronic hardware, computer software, or a combination thereof. In order to clearly describe the interchangeability between the hardware and the software, compositions and steps of each example have been generally described according to functions in the foregoing descriptions. Whether these functions are implemented in hardware or software depends on specific applications of the technical solutions and design constraints. A person skilled in the art may use different methods to implement the described functions for each specific application, but such implementation should not be considered to be beyond the scope of the present disclosure.

The steps of the method or algorithm described in the embodiments of the present disclosure may be implemented by hardware, a software module executed by a processor, or a combination of both. The software modules may reside in a RAM, a memory, a ROM memory, an electrically programmable ROM (EPROM), an electrically erasable programmable ROM (EEPROM), a register, a hard disk, a removable disk, a CD-ROM, or any other form of storage medium known in the art.

The purposes, the technical solutions and the beneficial effects of the present disclosure are described in further detail with reference to the above optional embodiments. It should be understood that the above embodiments are merely specific embodiments of the present disclosure but not intended to limit the present disclosure, and any modifications, equivalent replacements, improvements, etc. made within the spirit and principles of the present disclosure should be included within the scope of protection of the present disclosure.

What is claimed is:

1. A method of playback control, wherein the method is performed by a driving controller in a media playback system, the media playback system further comprises a pose adjustment mechanism and a media player, the pose adjustment mechanism is configured to adjust a pose of the media player, and the method comprises:

sending a pose adjustment instruction to the pose adjustment mechanism, wherein the pose adjustment instruction is used to instruct to adjust the pose of the media player; and sending a media control instruction to the media player, wherein the media control instruction is used to instruct to control playback of media data.

2. The method according to claim 1, wherein sending the media control instruction to the media player comprises one of:

sending the media control instruction to the media player while sending the pose adjustment instruction to the pose adjustment mechanism; and sending the media control instruction to the media player based on a current pose of the media player after sending the pose adjustment instruction to the pose adjustment mechanism.

3. The method according to claim 2, wherein the media playback system further comprises a pose sensor, and sending the media control instruction to the media player based on the current pose of the media player comprises:

receiving pose feedback information sent by the pose sensor, wherein the pose feedback information is used to indicate the current pose of the media player; and sending the media control instruction to the media player based on the current pose of the media player indicated by the pose feedback information.

4. The method according to claim 2, wherein sending the media control instruction to the media player based on the current pose of the media player comprises:

sending the media control instruction to the media player based on the current pose of the media player when the current pose of the media player belongs to a pose set.

5. The method according to claim 1, wherein the method further comprises: receiving a trigger instruction;
sending the pose adjustment instruction to the pose adjustment mechanism comprises: sending the pose adjustment instruction to the pose adjustment mechanism in response to the trigger instruction; and
sending the media control instruction to the media player comprises: sending the media control instruction to the media player in response to the trigger instruction.

6. The method according to claim 5, wherein the trigger instruction comprises target operation information for instructing an operation on the pose of the media player, and sending the media control instruction to the media player in response to the trigger instruction comprises:
sending a media control instruction corresponding to the target operation information to the media player based on a correspondence between operation information and control instructions.

7. The method according to claim 5, wherein the trigger instruction is used to indicate a target pose, and sending the pose adjustment instruction to the pose adjustment mechanism in response to the trigger instruction comprises:
determining the target pose indicated by the trigger instruction; and
sending the pose adjustment instruction to the pose adjustment mechanism, wherein the pose adjustment instruction is used to instruct to adjust the pose of the media player to the target pose.

8. The method according to claim 7, wherein the method satisfies any of the following conditions:
the trigger instruction comprises information about the target pose, and determining the target pose indicated by the trigger instruction comprises: determining the target pose based on the information about the target pose; and
determining the target pose indicated by the trigger instruction comprises: determining at least one pose in a pose list after a current pose of the media player as the target pose; and sending the pose adjustment instruction to the pose adjustment mechanism comprises: sending at least one pose adjustment instruction in a one-to-one correspondence with the at least one pose to the pose adjustment mechanism in a sequence of the at least one pose in the pose list, wherein the pose adjustment instruction is used to instruct to adjust the pose of the media player to a corresponding pose.

9. The method according to claim 8, wherein the media player comprises a display module, the media playback system further comprises a pose sensor, and sending the media control instruction to the media player comprises:
receiving, after sending the pose adjustment instruction to the pose adjustment mechanism, pose feedback information sent by the pose sensor, wherein the pose feedback information is used to indicate a current pose of the media player; and
sending the media control instruction to the media player based on the current pose of the media player when the current pose of the media player indicated by the pose feedback information belongs to a pose set, wherein
the media control instruction is used to instruct to control playback of the media data according to a target playback mode, the target playback mode is one of playback modes corresponding to poses in the pose set, and the target playback mode corresponds to the current pose;
the media player comprises the display module and the target playback mode comprises a mode of playing the media data starting at a target video frame, wherein the target video frame belongs to one of a currently playing video of the media player and a video other than the currently playing video;
the media control instruction comprises any of: information about the target playback mode and information about the current pose;
the trigger instruction comprises target operation information for instructing an operation on the pose of the media player, and sending the media control instruction to the media player in response to the trigger instruction comprises: sending a media control instruction corresponding to the target operation information to the media player based on a correspondence between operation information and control instructions;
the media playback system comprises a plurality of pose adjustment mechanisms and a plurality of media players which are in a one-to-one correspondence, and each of the pose adjustment mechanisms is configured to adjust a pose of a corresponding media player;
sending the pose adjustment instruction to the pose adjustment mechanism comprises: sending pose adjustment instructions to the plurality of pose adjustment mechanisms simultaneously; and sending the media control instruction to the media player comprises: sending media control instructions to the plurality of media players simultaneously;
the media control instruction is used to instruct to play the media data, and the plurality of media control instructions sent by the driving controller to the plurality of media players satisfy any of the following conditions: the plurality of media control instructions indicate the same media data, and the plurality of media control instructions indicate different pieces of media data; and
the method further comprises: sending a playback progress adjustment instruction to at least one media player when playback progresses of the plurality of media players are unsynchronized, to synchronize the playback progresses of the plurality of media players.

10. The method according to claim 1, wherein the method satisfies at least one of the following conditions:
sending the pose adjustment instruction to the pose adjustment mechanism comprises: sending pose adjustment instructions to the plurality of pose adjustment mechanisms simultaneously; and sending the media control instruction to the media player comprises: sending media control instructions to the plurality of media players simultaneously;
the media control instruction is used to instruct to play the media data, and the plurality of media control instructions sent by the driving controller to the plurality of media players satisfy any of: the plurality of media control instructions indicate the same media data; and, the plurality of media control instructions indicate different pieces of media data, wherein each piece of the media data is a video, and video frames with the same serial number in pieces of the media data indicated by the plurality of media control instructions are obtained by segmenting the same image; and
the method further comprises: sending a playback progress adjustment instruction to at least one media player when playback progresses of the plurality of media players are unsynchronized, to synchronize the playback progresses of the plurality of media players.

11. A non-transitory computer-readable storage medium, wherein instructions are stored on the non-transitory computer-readable storage medium, and when the instructions are run on a computer, the computer executes the method according to claim 1.

12. A method of playback control, wherein the method is performed by a media player in a media playback system, the media playback system further comprises a pose adjustment mechanism and a driving controller, the pose adjustment mechanism is configured to adjust a pose of the media player, and the method comprises:
  receiving a media control instruction sent by the driving controller, wherein the media control instruction comprises information about a current pose of the media player;
  determining, based on the information about the current pose in the media control instruction, a target playback mode corresponding to the current pose from playback modes corresponding to poses in a pose set, wherein the current pose is one of the poses in the pose set; and
  controlling playback of media data according to the target playback mode.

13. An electronic device, comprising a processor, a communication interface, a memory, and a communication bus, wherein any two of the processor, the communication interface, and the memory communicate with each other through the communication bus;
  the memory is configured to store a computer program; and
  the processor is configured to implement the method according to claim 12 when executing the computer program stored in the memory.

14. A non-transitory computer-readable storage medium, wherein instructions are stored on the non-transitory computer-readable storage medium, and when the instructions are run on a computer, the computer executes the method according to claim 12.

15. A media playback system, comprising: a driving controller, a pose adjustment mechanism and a media player, wherein
  the driving controller is configured to send a pose adjustment instruction to the pose adjustment mechanism, wherein the pose adjustment instruction is used to instruct to adjust a pose of the media player;
  the driving controller is further configured to send a media control instruction to the media player, wherein the media control instruction is used to instruct to control playback of media data;
  the pose adjustment mechanism is configured to adjust the pose of the media player according to the pose adjustment instruction; and
  the media player is configured to control playback of the media data according to the media control instruction.

16. An electronic device, comprising a processor, a communication interface, a memory, and a communication bus, wherein any two of the processor, the communication interface, and the memory communicate with each other through the communication bus;
  the memory is configured to store a computer program; and
  the processor is configured to implement the method according to claim 1 when executing the computer program stored in the memory.

\* \* \* \* \*